(12) United States Patent
Kulkarni

(10) Patent No.: US 8,959,389 B2
(45) Date of Patent: Feb. 17, 2015

(54) USE OF A VIRTUAL DRIVE AS A HOT SPARE FOR A RAID GROUP

(75) Inventor: Janmejay S. Kulkarni, Navi Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/303,683

(22) Filed: Nov. 23, 2011

(65) Prior Publication Data

US 2013/0132768 A1  May 23, 2013

(51) Int. Cl.
| | |
|---|---|
| G06F 11/00 | (2006.01) |
| G06F 11/20 | (2006.01) |
| G06F 11/10 | (2006.01) |
| G06F 11/16 | (2006.01) |

(52) U.S. Cl.
CPC ........ *G06F 11/2094* (2013.01); *G06F 11/1076* (2013.01); *G06F 11/1662* (2013.01); *G06F 2201/815* (2013.01); *G06F 2211/1059* (2013.01); *G06F 2211/1057* (2013.01)
USPC ........................................ 714/6.22; 714/6.32

(58) Field of Classification Search
USPC ................. 714/6.22, 6.32; 711/114, 161, 162
See application file for complete search history.

(56) References Cited

U.S. PATENT DOCUMENTS

| | | | |
|---|---|---|---|
| 5,872,906 A * | 2/1999 | Morita et al. ................ | 714/6.12 |
| 7,146,465 B2 | 12/2006 | Korgaonkar | |
| 7,330,932 B2 * | 2/2008 | Yamamoto .................... | 711/114 |
| 7,457,981 B2 * | 11/2008 | Morita ............................ | 714/6.2 |
| 7,457,982 B2 | 11/2008 | Rajan | |
| 7,873,700 B2 | 1/2011 | Pawlowski et al. | |
| 7,930,473 B2 | 4/2011 | Rajan et al. | |
| 7,958,168 B2 | 6/2011 | Chen et al. | |
| 2003/0056112 A1 * | 3/2003 | Vinson et al. ................. | 713/200 |
| 2006/0174157 A1 | 8/2006 | Barrall et al. | |
| 2007/0078794 A1 * | 4/2007 | Schnapp et al. ............. | 705/401 |
| 2008/0126839 A1 * | 5/2008 | Sangapu et al. .................. | 714/5 |
| 2008/0208930 A1 | 8/2008 | Kubo et al. | |
| 2010/0251012 A1 * | 9/2010 | Zwisler et al. ..................... | 714/7 |
| 2012/0096309 A1 * | 4/2012 | Kumar et al. ................ | 714/6.22 |
| 2013/0132769 A1 | 5/2013 | Kulkarni | |

FOREIGN PATENT DOCUMENTS

| | | |
|---|---|---|
| CN | 101414273 A | 4/2009 |
| CN | 101980137 A | 2/2011 |
| CN | 103946846 A | 7/2014 |
| DE | 112012004318 T5 | 8/2014 |

(Continued)

OTHER PUBLICATIONS

International Appln. No. PCT/CN2012/080279 International Search Report and Written Opinion, Nov. 29, 2012, 10 pgs.

(Continued)

*Primary Examiner* — Yolanda L Wilson
(74) *Attorney, Agent, or Firm* — Cuenot, Forsythe & Kim, LLC

(57) ABSTRACT

A method that includes identifying a failure indication for a first data storage device that is a member of a first RAID group within a storage array. The method further can include, via a processor external to the storage array, identifying a virtual drive that is defined to include at least one logical storage volume defined in a second RAID group. The virtual drive can be provisioned to serve as a virtual hot spare within the first RAID group to replace the first data storage device.

24 Claims, 7 Drawing Sheets

(56) References Cited

FOREIGN PATENT DOCUMENTS

| EP | 0726521 | B1 | 10/2003 |
|---|---|---|---|
| GB | 2511681 | A | 9/2014 |
| WO | 2005078567 | A2 | 8/2005 |
| WO | 2011037629 | A1 | 3/2011 |
| WO | 2013075519 | A1 | 5/2013 |

OTHER PUBLICATIONS

Li, Y., "Scalability of RAID Systems," [online] The University of Edinburgh, 2010, retrieved from the Internet: <http://www.era.lib.ed.ac.uk/bitstream/1842/4624/1/Li2010.pdf> 201 pgs. [submitted in 2 parts due to size].

Larson, W.A., et al., "Virtual Hot Spare Disk Units," IBM Technical Disclosure Bulletin, IBM Corp., New York, vol. 37, No. 9, pp. 5-8, Sep. 1, 1994, 5 pgs.

U.S. Appl. No. 13/554,544, Non-Final Office Action, Aug. 15, 2013, 10 pg.

U.S. Appl. No. 13/554,544, Final Office Action, Nov. 15, 2013, 10 pg.

U.S. Appl. No. 13/554,544, Final Office Action, Feb. 28, 2014, 14 pg.

* cited by examiner

USE OF A VIRTUAL DRIVE AS A HOT SPARE FOR A RAID GROUP

BACKGROUND

One or more embodiments disclosed within this specification relate to data storage systems.

In a storage subsystem, hard disk drives (HDDs) typically are grouped together forming a redundant group of independent disks (RAID). There are several types of RAID schemes that are commonly used. These schemes are identified by the word "RAID" followed by a number (e.g., "RAID 0," "RAID 1," "RAID 2," "RAID 3," etc.).

With the exception of RAID 0, which implements block-level striping across multiple HDDs without parity or mirroring, RAID is a storage technology that functions through redundancy to increase the reliability of a storage subsystem. In a RAID 1 group, for example, fault tolerance is provided by mirroring the data on multiple HDDs. In a RAID 5 group, block-level striping is implemented across multiple HDDs, and parity information is distributed across the multiple HDDs. The parity information can be used to re-build the RAID group in the case that one of the HDDs fail. Thus, the available storage volume is equal to $X(n-1)$, where X is the storage volume available on each individual HDD and n is the number is HDDs in the RAID group. In a RAID 6 group, block-level striping is implemented across multiple HDDs, and double parity information is distributed across the multiple HDDs. The parity information can be used to re-build the RAID group in the case that two of the HDDs fail. Thus, the available storage volume is equal to $X(n-2)$.

BRIEF SUMMARY

One or more embodiments disclosed within this specification relate to the use of a virtual drive as a virtual hot spare in a RAID group. An embodiment can include a method that includes identifying a failure indication for a first data storage device that is a member of a first RAID group within a storage array. The method further can include, via a processor external to the storage array, identifying a virtual drive that is defined to include at least one logical storage volume defined in a second RAID group. The virtual drive can be provisioned to serve as a virtual hot spare within the first RAID group to replace the first data storage device.

Another embodiment can include a method that includes identifying a failure indication for a first data storage device that is a member of a first RAID group of a first storage array. The method further can include, via a processor, provisioning a virtual drive to serve as a virtual hot spare within the first RAID group to replace the first data storage device. The virtual drive can be a data storage volume defined to include a plurality of logical storage volumes defined in at least one other RAID group in at least a second storage array.

Another embodiment can include a system. The system can include a processor configured to initiate executable operations. Such operations can include, external to a storage array, identifying a failure indication for a first data storage device that is a member of a first RAID group within the storage array. The operations further can include identifying a virtual drive that is defined to include at least one logical storage volume defined in a second RAID group, and provisioning the virtual drive to serve as a virtual hot spare within the first RAID group to replace the first data storage device.

Another embodiment can include a computer program product. The computer program product can include a computer-readable storage medium having computer-readable program code embodied therewith. The computer-readable program code can be configured to perform the various operations and/or functions disclosed within this specification.

DETAILED DESCRIPTION

Figure 1:
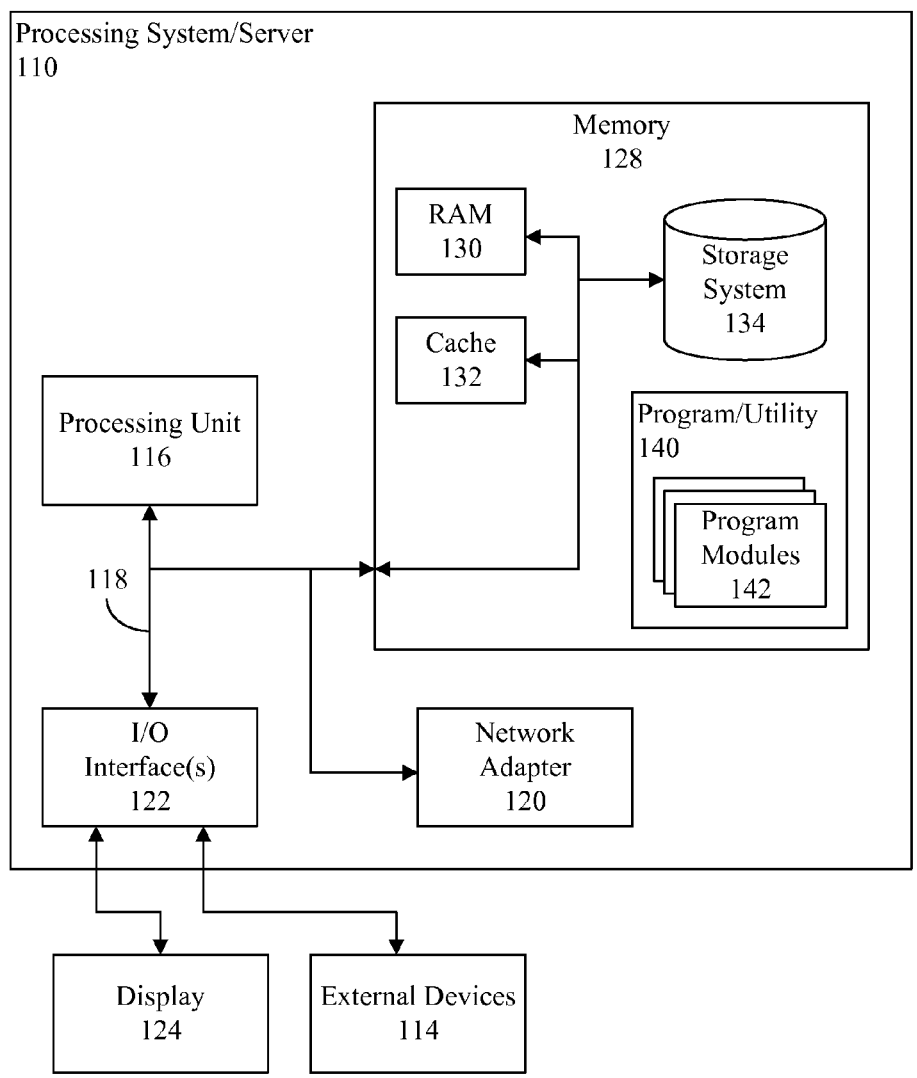
FIG. 1 is a block diagram illustrating a processing system/server of a cloud computing node in accordance with one embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

The cloud computing node 100 there can be a processing system/server 110, which is operational with numerous other general purpose or special purpose computing system environments or configurations. Examples of well-known computing systems, environments, and/or configurations that may be suitable for use with processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the processing system/server 110 in the cloud computing node 100 is shown in the form of a general-purpose computing device. The components of the processing system/server 110 may include, but are not limited to, one or more processors or processing units 116 (e.g., one or more processors or controllers), a system memory 128, and a bus 118 that couples various system components including system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing system/server 110 typically may include a variety of computer-readable storage media. Such media may be any available media that is accessible by the processing system/server 110, and it includes both volatile and non-volatile media, removable and non-removable media. System memory 128 can include computer-readable storage media in the form of volatile memory, such as random access memory (RAM) 130 and/or cache memory 132. The processing system/server 110 may further include other removable/non-removable, volatile/non-volatile computer-readable storage media. By way of example only, a storage system 134 can be provided for reading from and writing to at least one non-volatile computer-readable storage media. Examples of a non-volatile computer-readable storage media are computer-readable storage devices that store data, which also may be referred to as "data storage devices." Examples of computer-readable storage devices can include, but are not limited to, a device that comprises non-volatile magnetic media (e.g., a "hard disk drive" or "HDD"), non-volatile solid state media (e.g., a "solid state drive" or "SSD"), non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

The memory 128 may include at least one computer program product that includes a non-volatile computer readable storage medium having computer-readable program code embodied therewith. The computer-readable program code can include a set (e.g., at least one) of program modules that are configured to carry out the functions of embodiments of the invention. The program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

The processing system/server 110 may also communicate with one or more external devices 114 such as a keyboard, a pointing device, a display 124, etc.; one or more devices that enable a user to interact with processing system/server 110; and/or any devices (e.g., network card, modem, etc.) that enable processing system/server 110 to communicate with one or more other computing devices. Such communication can occur via Input/Output (I/O) interfaces 122. Still yet, the processing system/server 110 can communicate with one or more networks such as a local area network (LAN), a general wide area network (WAN), and/or a public network (e.g., the Internet) via network adapter 120. As depicted, the network adapter 120 can communicate with the other components of the processing system/server 110 via the bus 118. It should be understood that although not shown, other hardware and/or software components could be used in conjunction with the processing system/server 110. Examples, include, but are not limited to: microcode, device drivers, redundant processing units, external disk drive arrays, RAID systems, tape drives, and data archival storage systems, etc.

Figure 2:
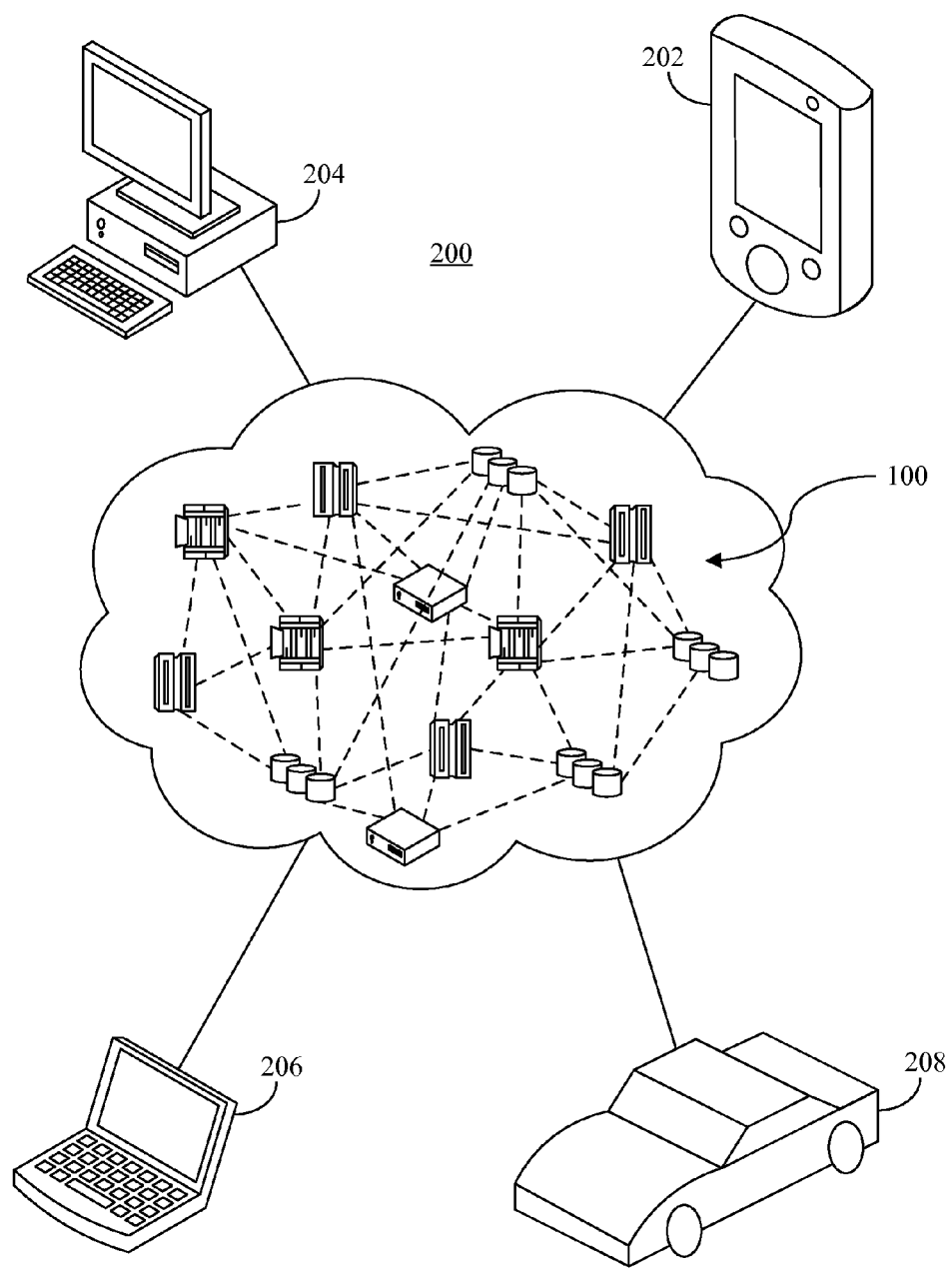
FIG. 2 depicts a cloud computing environment in accordance with one embodiment of the present invention.

Referring now to FIG. 2, an illustrative cloud computing environment 200 is depicted. As shown, the cloud computing environment 200 comprises one or more cloud computing nodes 100 with which local computing devices used by cloud consumers, such as, for example, a personal digital assistant (PDA) or cellular telephone 202, a desktop computer 204, a laptop computer 206, and/or an automobile computer system 208 may communicate. The nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202-208 shown in FIG. 2 are intended to be illustrative only and that the computing nodes 100 and cloud computing environment 200 can communicate with any type of computerized device over any type of network and/or network addressable connection (e.g., using a web browser).

Figure 3:
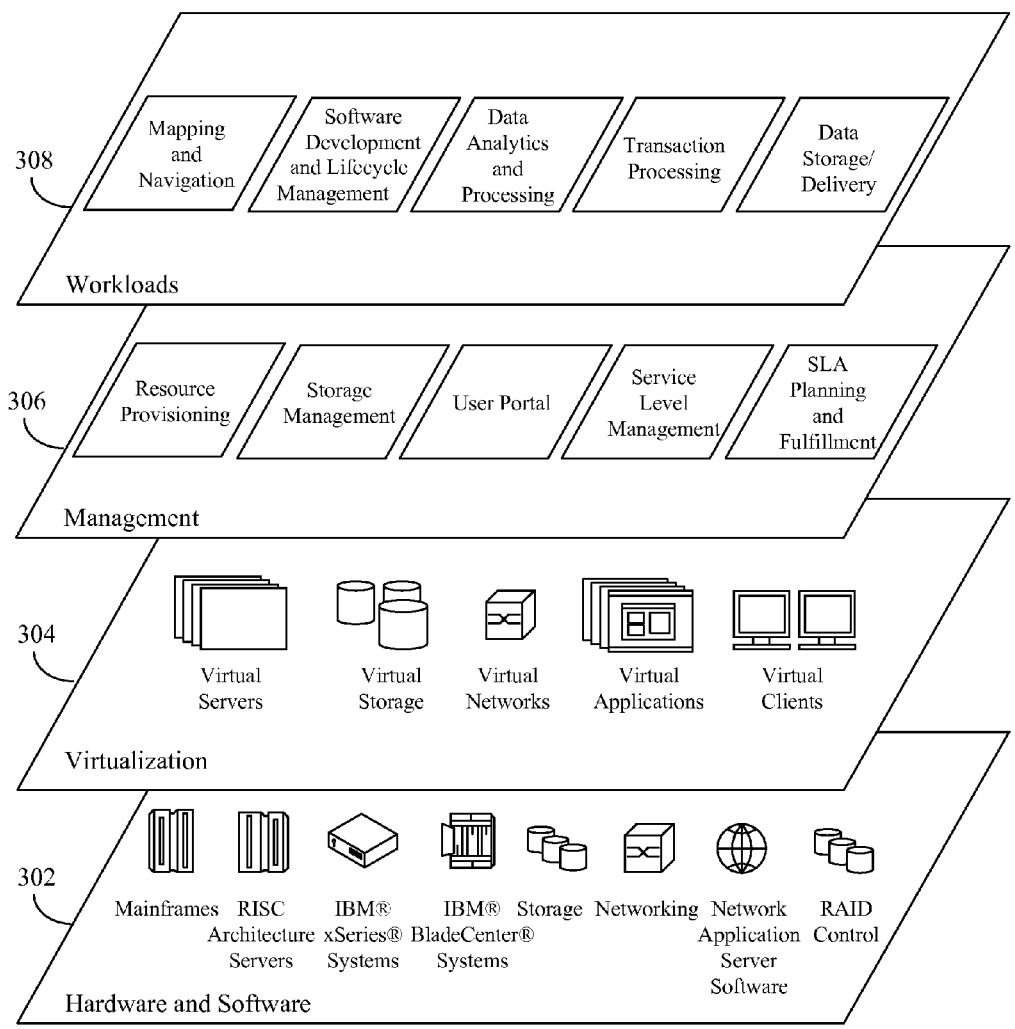
FIG. 3 depicts functional abstraction layers provided by a cloud computing environment in accordance with one embodiment of the present invention.

Referring now to FIG. 3, a set 300 of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 302 can include hardware and software components. Examples of hardware components include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage systems (e.g., storage arrays, network attached storages (NASs), and the like); and networking components. Networking components can include any of a variety of routers, switches, network adapters, and the like.

Examples of software components include network application server software, in one example IBM WebSphere® application server software; and storage array control software, in one example IBM SAN volume controller, which can execute on an IBM SVC Storage Engine. (IBM, zSeries, pSeries, xSeries, BladeCenter, WebSphere, and DB2 are trademarks of International Business Machines Corporation registered in many jurisdictions worldwide).

A virtualization layer 304 can provide an abstraction layer from which the following examples of virtual entities may be provided: virtual servers; virtual storage; virtual networks, including virtual private networks; virtual applications and operating systems; and virtual clients.

In one example, a management layer 306 may provide the functions described below. Resource provisioning provides dynamic procurement of computing resources and other resources that are utilized to perform tasks within the cloud computing environment. Storage management manages the virtual storage within the cloud computing environment, some aspects of which will be discussed herein if further detail. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide examples of functionality for which the cloud computing environment may be utilized. Examples of workloads and functions which may be provided from this layer include: mapping and navigation; software development and lifecycle management; data analytics processing; transaction processing; and data storage/delivery.

In accordance with the embodiments described herein, a storage manager can provision virtual drives to storage arrays for use as virtual hot spares within a cloud computing environment. In illustration, if there is a failure indication indicating that a physical data storage device within a RAID group has failed or imminently is going to fail, a virtual drive can be provisioned to the RAID group to serve as a virtual hot spare for the failed data physical data storage device in the RAID group while the RAID group is still active in the cloud computing environment, and data previously stored on the failed data storage device can be recovered to the virtual drive. In a RAID 5 group, for example, the RAID parity information and data stored to the other data storage devices which have not failed can be processed to re-build the data to the virtual drive. In this manner, data loss can be avoided in the event of a data storage device failure. Moreover, the RAID group need not be taken off-line while the data is being re-built to the virtual drive.

The virtual drive that is used as the virtual hot spare can be assigned as a logical storage volume outside of the storage array where the failed physical storage device is contained. For example the virtual drive can be defined by a storage manager or a control node.

Using storage virtualization, the virtual drive can be defined to include storage space contained within any number of storage arrays within the cloud storage environment. For instance, the virtual drive can be defined to include storage space contained in the storage array in which the failed data storage device exists and/or one or more other storage arrays. In this regard, some of the storage space allocated for use within the virtual drive may be contained in the storage array in which the failed physical data storage device is located (though not inclusive of a storage volume that is at least partially defined on the failed data storage device), and some of the storage space can be contained in one or more other storage arrays. Moreover, all of the storage space allocated for use within the virtual drive can be contained in one or more of the other storage arrays. Thus, the virtualization of storage space as described herein provides for a very robust and flexible data protection system for use with various RAID groups active in a cloud storage environment.

As used herein, the term "virtual drive" means a data storage volume defined across one or more storage arrays. In illustration, a virtual drive can include one or more logical storage volumes defined in one or more RAID groups. Each such logical volume can be assigned a logical unit number (LUN). As used herein, the term "virtual hot spare" means a virtual drive provisioned to be used in place of a physical data storage device (e.g., a HDD, SSD, or the like) in a RAID group, and which is configured to replace the data storage device while the RAID group remains active and before or after the physical data storage device is physically removed from a storage enclosure in which the data storage device is installed. As used herein, a storage array includes one or more RAID groups. As used herein, a RAID group comprises a plurality of data storages in a RAID configuration comprising a plurality of physical data storage devises.

Figure 4:
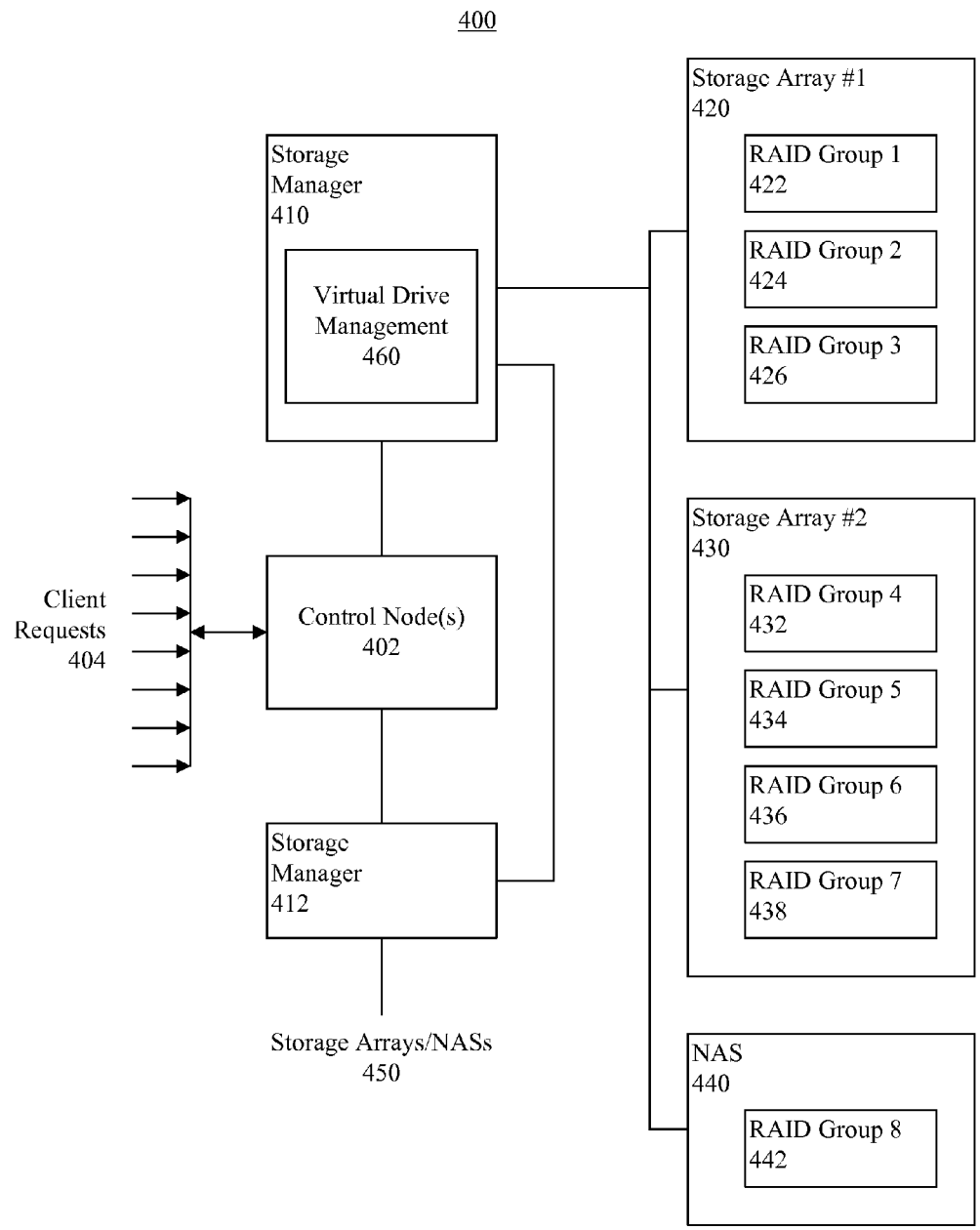
FIG. 4 is depicts a storage system in accordance with one embodiment of the present invention.

FIG. 4 is depicts a storage system 400 provided in a cloud computing environment, for example in a SAN, in accordance with one embodiment of the present invention. The storage system 400 can include one or more control nodes 402. A control node 402 can be implemented using any suitable processing system/device, such as the processing system 110 described in FIG. 1. The control node 402 can receive and process client requests 404 for storage requirements, and operate as a gateway for such client requests 404 to the storage system 400. The control node 402 also can configure the type and amount of storage space to provide in response to the client requests 404, as well as provide other storage related services.

The storage system 400 also can include one or more storage managers 410, 412 communicatively linked to the control node(s) 402. A storage managers 410, 412 can be implemented using any suitable processing system/device, such as the processing system 110 described in FIG. 1. The storage managers 410, 412 can be IBM SAN Volume Controllers, or any other suitable storage managers suitably configured to perform the processes and functions described herein. Each storage manager 410, 412 can manage one or more storage arrays and/or NASs 420, 430, 440, 450. For example, the storage manager 410 can manage a plurality of RAID groups 422, 424, 426 within a storage array 420, a plurality of RAID groups 432, 434, 436, 438 within a storage array 430, and one or more RAID groups, such as a RAID Group 442, within a NAS 440. Similarly, the storage manager 412 can manage one or more RAID groups within other storage arrays and/or NASs. At this point it should be noted that each storage array and/or NAS can include any number of RAID groups not exceeding their respective RAID capacities.

Each RAID group 422-426, 432-438, 442 can include a plurality of data storage devices. Each data storage device can be assigned an address or other suitable identifier that identifies the data storage device within a respective RAID group. The data storage devices can be SATA drives that are controlled via a SATA control interface, SCSI drives that are controlled via a SCSI control interface, SAS drives that are controlled via a SAS control interface, fiber channel drives that are controlled via a fiber channel control interface, or any other drives suitable for use in a RAID group. The data storage devices can be configured to communicate using any of a variety of suitable protocols, for example iSCI, FCOE, NAS, FC or the like.

Figure 5:
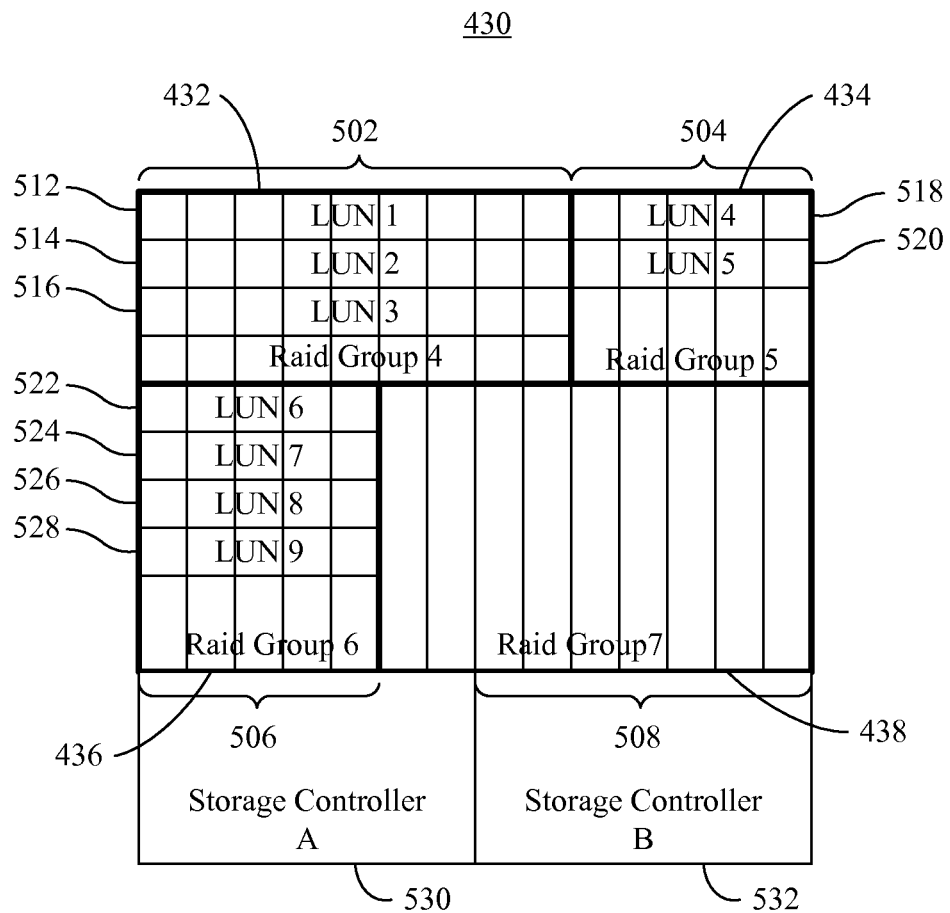
FIG. 5 is depicts a storage array in accordance with one embodiment of the present invention.

For illustrative purposes, FIG. 5 is depicts an example of the storage array 430 in accordance with one embodiment of the present invention. The storage array 430 can include one or more RAID groups 432-438, each of which comprises a respective plurality of physical data storage devices 502, 504, 506, 508. These RAID groups 432-438 can be managed by one or more storage controllers 530, 532.

One or more of the RAID groups 432-438 can have one or more logical storage volumes 512, 514, 516, 518, 520, 522, 524, 526, 528 of storage space defined therein. The logical storage volumes 512-528 can be defined across the respective physical data storage devices 502-508 identified by respective LUNs. One or more of these logical storage volumes 512-528 can be assigned for use as storage space assigned to one or more respective virtual drives. By way of example, a particular virtual drive can include the logical storage volume 512, the logical storage volume 526 and/or one or more logical storage volume defined outside of the storage array 430. Similarly, the logical storage volume 528 can be assigned to another virtual drive, and so on. The assignment of the logical storage volumes 512-528 to virtual drives can be handled externally to the storage array 430. In illustration, referring again to FIG. 4, the storage managers 410, 412 and/or control node(s) 402 can assign the logical storage volume 512-528, as well as logical storage volume defined in other storage arrays and/or NASs, to respective virtual drives.

Each storage manager 410, 412 and/or control node(s) 402 can leverage the benefits of cloud computing (e.g., cloud storage) to provide protection to the RAID groups 422-426, 432-438, 442 when a failure indication indicates a data storage device has failed or imminently is going to fail. For example, the storage manager 410, 412 and/or the control node(s) 402 can use virtual drives as virtual hot spares available to the RAID groups 422-426, 432-438, 442, as will be described herein further detail.

In illustration, one or more virtual drives can be defined to use logical storage volumes defined in one or more of the storage arrays 420, 430 and NASs 440 managed by the storage manager 410 and/or control nodes(s) 402. Specifically, one or more logical storage volumes defined across one or more of the storage arrays 420, 430 and NASs 440 can be allocated to a particular virtual drive. Moreover, other logical storage volumes can be allocated to other virtual drives.

Figure 6:
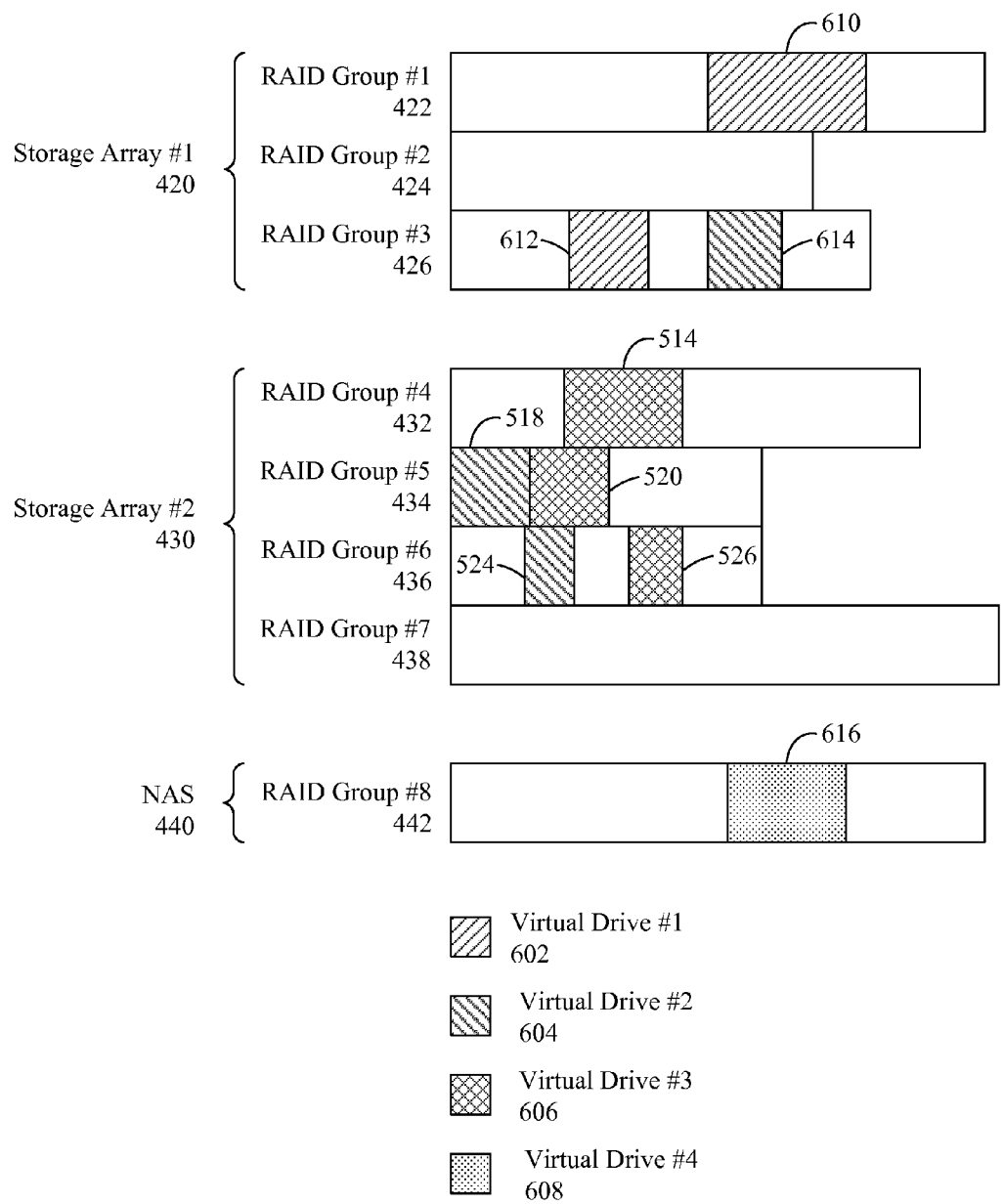
FIG. 6 depicts assignments to virtual drives of logical storage volumes defined across various RAID groups in accordance with one embodiment of the present invention.

FIG. 6 depicts assignments to virtual drives 602, 604, 606, 608 of logical storage volumes defined across various RAID groups 422-426, 432-438, 442 in accordance with one embodiment of the present invention. By way of example, a first virtual drive 602 can be defined to include logical storage volumes defined 610, 612 in RAID groups 422, 426 of the storage array 420, a second virtual drive 604 can be defined to include logical storage volume 614 defined in RAID group 426 of the storage array 420 and logical storage volumes 518, 524 defined in RAID groups 434-436 of the storage array 430, a third virtual drive 606 can be defined to include logical storage volumes 514, 520, 526 defined in RAID groups 432-436 of the storage array 430, and a fourth virtual drive 608 can be defined to include a logical storage volume 616 defined in the RAID group 442 of the NAS 440. These assignments are merely presented for example purposes, and the virtual drives can include any of one or more logical storage volumes defined anywhere within the storage system 400 of FIG. 4.

The virtual drives 602-608 need not be the same size. In illustration, assume that the storage system 400 (FIG. 4) includes physical data storage devices having different storage capacities, for example 400 GB, 500 GB, 750 GB and 1 TB. For each level of capacity, one or more virtual drives 602-608 having that storage capacity can be defined. For instance, one or more virtual drives 602-608 can be defined to have a storage capacity of 400 GB, one or more virtual drives 602-608 can be defined to have a storage capacity of 500 GB, one or more virtual drives 602-608 can be defined to have a storage capacity of 750 GB, and one or more virtual drives 602-608 can be defined to have a storage capacity of 1 TB. Further, it should be noted that a virtual drive can, but need not, have the same storage volume as failed physical data storage device which the virtual drive will replace as a virtual hot spare. For example, the virtual drive can have greater storage volume than the failed physical data storage device, though not all of the volume on the virtual drive need be used.

Moreover, the RAID groups 422-426, 432-438, 442 that provide logical storage volumes 514-526, 610-616 for the virtual drives 602-608 need not be the same type of RAID groups. For instance, various ones of the RAID groups 422-426, 432-438, 442 can implement different RAID schemes (e.g., RAID 0, RAID 1, RAID 2, RAID 3, RAID 4, RAID 5, RAID 6, RAID 7, RAID 8, RAID 9, RAID 10, and so on), though this need not be the case. Further, various ones of the RAID groups 422-426, 432-438, 442 can utilize different types of data storage devices (e.g., fiber channel HDDs or SSDs, SATA HDDs or SSDs, SCSI HDDs or SSDs, SAS HDDs or SSDs, etc.) though, again, this is not required. Moreover, the data storage devices within the RAID groups 422-426, 432-438, 442 across which the virtual drives 602-608 are defined need not be the same type of data storage devices within the RAID groups for which the virtual drives 602-608 are provisioned to serve as virtual hot spares. For example, assume the RAID group 422 utilizes fiber channel drives, and the RAID groups 432-438 utilize SATA drives. The virtual drive 604 can be provisioned to serve as a virtual hot spare for the RAID group 422, even though the RAID group 422 uses different types of drives than the RAID groups 432-438.

When a virtual drive 602-606 uses a plurality of logical storage volumes defined across respective RAID groups, various ones of the RAID groups 422-426, 432-438, 442 each can contribute a portion of the overall storage volume assigned as a virtual drive 602-606. By way of example, if the virtual drive 606 is defined to have a storage capacity of 400 GB, the RAID group 432 can provide 200 GB of storage space for use by the virtual drive 606, the RAID group 434 can provide 100 GB of storage space for use by the virtual drive 606, and the RAID group 436 can provide 100 GB of storage space for use by the virtual drive 606. In this regard, the amount of storage space allocated to the virtual drive 606 need not be consistent across each of the RAID groups 432-436. Although every RAID group 432-438 within the storage array 430 can contribute storage volume for the virtual drive 606, this need not be the case. For example, RAID groups 432-436 can provide logical storage volumes for use in the virtual drive 606, while the RAID group 438 does not.

Further, the RAID groups 422-426, 432-438, 442 can have other logical storage volumes defined thereon. For example, if a particular RAID group 432 has a total storage capacity of 1.6 TB, 100 GB can be allocated as storage space for a portion of the virtual drive 604, 200 GB can be allocated as storage space for a portion of the virtual drive 606, and the remaining 1.1 TB can be allocated to other virtual drives and/or for other storage use.

In one embodiment, the virtual drives 602-608 can be defined by a user, such as a system administrator, and identified as being available for use as virtual hot spares, for example using one or more storage utilities provided by the storage manager 410 (FIG. 4) or another processing system communicatively linked to the storage manager 410. The virtual drives 602-608 can be maintained in a reserved pool by the control node 402 such that the virtual drives 602-608 are read-only enabled to protect the virtual drives 602-608 from being used for data storage until the virtual drives 602-608 are allocated for use as virtual hot spares. The user can provide such protection to a particular storage array 420, 430 or NAS, or can choose not to provide the protection, depending on the priority of the virtual drives 602-608 with respect to other requirements.

In another embodiment, the storage manager 410 can dynamically define the virtual drives 602-608, for example when needed, and specify that the virtual drives 602-608 to be available for use as virtual hot spares. In this regard, the storage manager 410 can include a virtual drive management module 460 (FIG. 4) to define and manage the virtual drives. In an embodiment in which the control node 402 manages allocation of the virtual drives 602-608, the control node 402 can communicate an event to the storage manager 410 to trigger the virtual drive management module 460 to create the virtual drive 602-608 being requested.

The virtual drives 602-608 can be utilized by storage arrays and NASs 420, 430, 440, 450 as virtual hot spares to replace, at least temporarily, failed data storage devices within the storage system 400. As used herein, the term "failed storage device" means a storage device that has failed or for which there is an indication of imminent failure. In this regard, the storage controllers of the storage arrays and NASs 420, 430, 440, 450, such as storage controllers 530, 532 (FIG. 5), can be configured to communicate data storage device failure events to the control node 402 and/or storage managers 412, 412, and to view ports of the control node 402 and/or storage managers 412, 412 as target ports for RAID storage management.

By way of example, referring again to FIG. 4, in normal operation the RAID group 422 can continue to function normally (e.g., there are no failed data storage devices within the RAID group 422). In this case, one or more ports of the control node 402 (or storage manager 410) can be presented to the storage array 420 as storage initiators, in which case one or more ports of the storage array 420 can be presented as storage targets. In other words, the control node 402 (or storage manager 410) can request from the storage array 420 storage resources available in the RAID group 422 in a conventional manner.

The control node 402 (or storage manager 410) can monitor the storage arrays 420, 430 and NAS 440 for performance and failure analysis. When the control node 402 (or storage manager 410) identifies a failure indication indicating that a data storage device within a RAID group, such as the RAID group 422, has failed or is going to fail imminently, the control node 402 (or storage manager 410) can generate an event to trigger the a virtual drive 602-608 to be selected or created for use as a virtual hot spare to replace the failed data storage device. Such event can indicate the storage array 420 and RAID group 422 in which the failed data storage device is a member, the drive type of the failed data storage device, the storage capacity of the failed data storage device, and the address of the failed data storage device.

In response to the event, the control node 402 (or storage manager 410) can search the cloud computing environment for available virtual drives 602-608 (FIG. 6), and select a virtual drive 602-608 having at least the same storage volume as the failed data storage device. In doing so, the control node 402 (or storage manager 410) can communicate with other storage managers 450 within the storage system 400, as well as storage managers and/or control nodes of other storage systems within the cloud computing environment. The selected virtual drive 602-608 then can be provisioned (e.g., assigned and used) to serve as a virtual hot spare to replace, at least temporarily, the failed data storage device. In another embodiment, when the storage manager 410 receives the failed data storage device alert, the storage manager 410 can dynamically create a virtual drive 602-608 to be provisioned to serve as the virtual hot spare. For example, the storage manager can identify unused logical storage volumes within the storage system 400 and allocate a suitable number of these unused logical storage volumes to the virtual drive 602-608.

When selecting a virtual drive 602-608, the control node 402 can ignore virtual drives and/or logical storage volume that use storage space provided by the RAID group 422 having the failed storage device. For example, the virtual drive 602 can be identified as being unavailable. When creating a virtual drive, the RAID group 422 can be excluded as being a potential candidate to provide logical storage volume for the virtual drive.

When a virtual drive, for example virtual drive 604, is selected or created to be provisioned to serve as the virtual hot spare, the virtual drive 604 can be evaluated to determine whether the virtual drive 604 is healthy. In other words, a determination can be made whether the virtual drive 604 is suitable to be used as a virtual hot spare. For example, the RAID groups 432-438 can be evaluated to determine whether such RAID groups themselves presently have any failed data storage devices, or for which there is an indication of imminent failure. If so, the virtual drive 604 can be identified as being unhealthy, and another virtual drive can be selected.

Assuming the virtual drive 604 is healthy, the virtual drive 604 automatically can be read/write enabled and provisioned to serve as a logical storage volume within the RAID group 422 to replace the failed data storage device. Further, the address of the failed storage device can be mapped to the virtual drive 604. The address can comprise an enclosure number and/or port/slot number, or any other address suitable for identifying a storage device. In illustration, each virtual drive 602-608 can have be assigned an address, and the control node 402 can logically map the address of the selected and/or created virtual drive to the RAID group address of the failed storage device. In this regard, one or more ports of the control node 402 (or storage manager 410) managing the storage array/NAS in which the virtual drive 604 is defined can appear as storage targets to the storage array 420. Thus, ports of the control node 402 can be presented both as initiators and as targets to the storage array 420.

The RAID type defined for the failed storage devices RAID group 422 then can be identified and the data from the failed storage device can be recovered by re-building such data to the virtual drive 604. The RAID group 422 need not be de-activated while the above processes are performed, not afterwards. Since the provisioning described herein involves the use of a virtual drive 604, and the RAID group 422 can remain active during and after the provisioning process, the virtual drive may be considered a virtual hot spare.

It is anticipated that at some point the failed data storage device will be replaced with a new data storage device. When the new data storage device is added to the RAID group 422, the new data storage device can be assigned the same address previously assigned to the failed data storage device. Further, the data from the virtual drive 604 re-built to the new data storage device. For example, the data from the virtual drive 604 can be mirrored to the new data storage device, or the data can be re-built from the other logical storage volumes in the RAID group 422 using conventional logical storage volume re-building algorithms. The mapping of the address previously assigned to the failed storage device to the address of virtual drive 604 then can be removed, and the virtual drive 604 can be returned to the pool of available virtual drives. In addition, the virtual drive 604 can be read-only enabled. In another embodiment, the data storage space provided by the RAID groups 432-438 to the virtual drive 604 can be unallocated from the virtual drive, and freed for other use.

Figure 7:
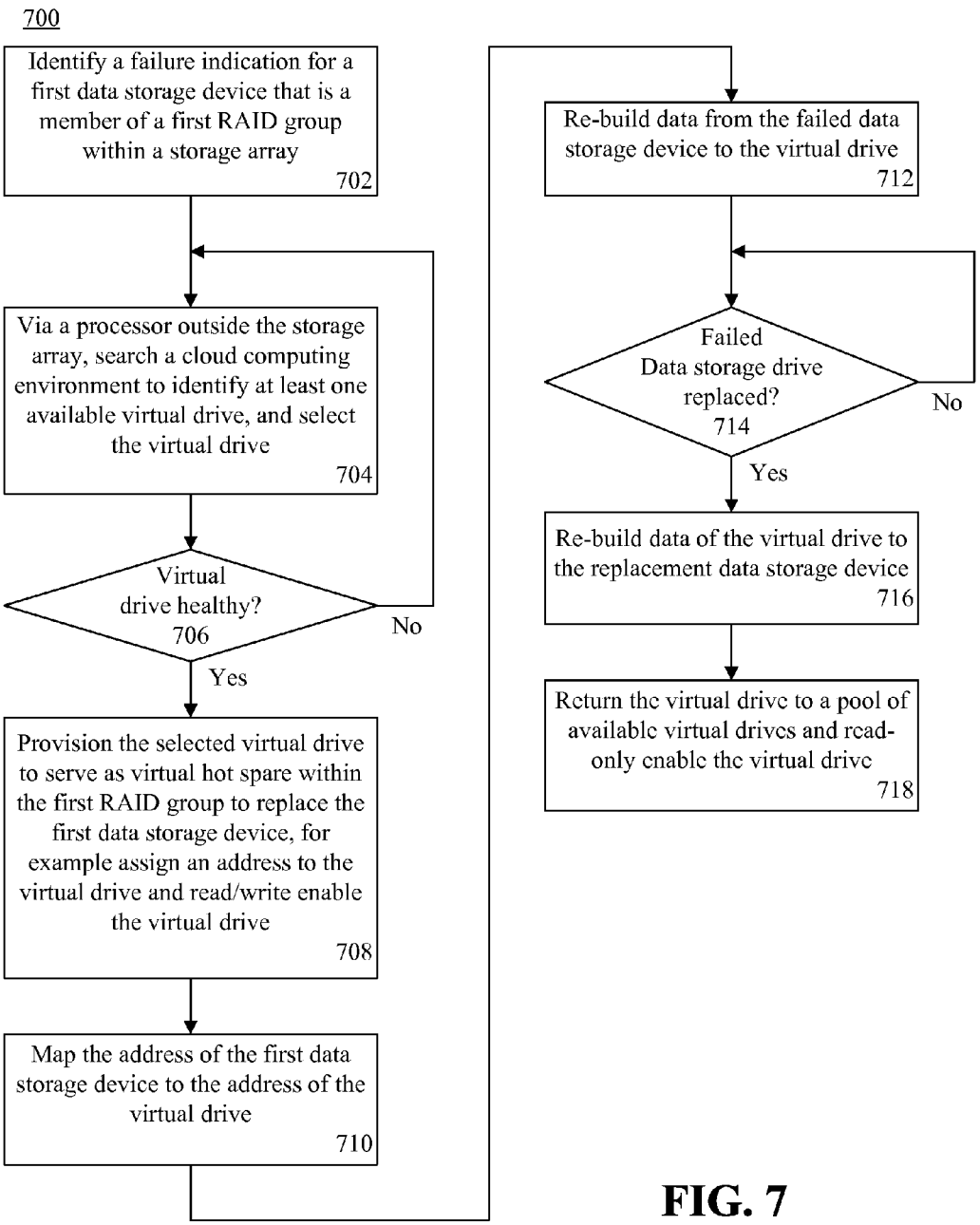
FIG. 7 is a flow chart illustrating a method of in accordance with another embodiment of the present invention.

FIG. 7 is a flow chart illustrating a method of 700 in accordance with another embodiment of the present invention. At step 702, a storage manager or control node in a (e.g., cloud storage) environment can identify a failure indication for a first data storage device that is a member of a first RAID group. For example, a storage controller that manages the first RAID group within a respective storage array can identify a data storage device failure, or impending failure, and send an event (e.g., as a message) to the storage manager or control node, which can be external to the storage array. As noted, the storage manager or control node can include at least one processor that executes suitable computer-readable program code to implement the processes and functions described herein.

At step 704, the cloud computing environment can be searched to identify at least one available virtual drive, and the virtual drive can be selected. The selected virtual drive can have the same storage capacity as the failed data storage device, or more storage capacity. In another embodiment, when the failure indication is identified, the virtual drive can be automatically created. As noted, the virtual drive can be defined to include logical storage volume from one or more RAID groups.

At step 706, a determination can be made as to whether the selected (or created) virtual drive is healthy. For example, a determination can be made whether the virtual drive includes logical storage volume from a RAID group that includes the failed physical storage device or includes another failed storage device, in which case the virtual drive can be identified as being unhealthy. If the virtual drive is not healthy, the process can return to step 704 and another virtual drive can be selected (or created). If the selected virtual drive is healthy, at step 708 the storage controller or control node can provision the selected virtual to serve as a virtual hot spare within the first RAID group to replace the first data storage device. For example, the storage controller or control node can assign an address to the virtual drive and can read/write enable the virtual drive.

At step 710, the storage controller or control node further can map the address of the failed storage device to the address assigned to the virtual drive. In this regard, storage manager or control node can update the storage controller so that the storage manager or control node appears as a target for the address if the failed physical data storage device rather than the failed data storage device itself. Such update can be performed by communicating a suitable configuration message from the storage manager or control node to the storage manager.

At step 712, data from the failed storage device can be re-built to the virtual drive. For example, a storage controller in the RAID array can re-build the data to the address of the failed physical storage device, which has been mapped to the address of the virtual drive.

Referring to decision box 714, when the failed data storage device is replaced with another physical data storage device, at step 716 the data of the virtual drive can be re-built to the replacement data storage device. For example, the storage manager or control node can update the storage controller so that the new physical data storage device is the target for the storage device address, and the data can be re-built from the data and parity information contained on the other physical data storage devices within the RAID group. Further, the storage manager or control node can update the storage controller and can remove the mapping of the physical data storage device address to the virtual drive.

At step 718, the virtual drive can be returned to a pool of available virtual drives and the virtual drive can be read-only enabled.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product comprising:
   a computer-readable storage device having computer-readable program code embodied therewith, the computer-readable program code comprising:
   computer-readable program code configured to identify a failure indication for a first data storage device that is a member of a first RAID group of a storage array;
   computer-readable program code configured to, via a processor external to the storage array, identify a virtual drive that is defined to include at least one logical storage volume defined in a second RAID group;
   computer-readable program code configured to determine whether the virtual drive is healthy; and
   computer-readable program code configured to provision the virtual drive to serve as a virtual hot spare within the first RAID group to replace the first data storage device, wherein
   the computer usable storage device is not a transitory, propagating signal per se, and
   the computer-readable program code configured to provision the virtual drive to serve as the virtual hot spare within the first RAID group comprises computer-readable program code configured to provision the virtual drive only if the virtual drive is healthy.

2. The computer program product of claim 1, wherein the computer-readable program code configured to provision the virtual drive to serve as the virtual hot spare within the first RAID group comprises:
   computer-readable program code configured to assigning an address to the virtual drive;
   the computer-readable program code further comprising:
   computer-readable program code configured to map an address of the first data storage device to the address assigned to the virtual drive.

3. The computer program product of claim 1, wherein:
   the virtual drive is defined to include at least a second logical storage volume defined in at least a third RAID group, wherein each of the first and second logical storage volumes contribute a respective portion of the overall storage volume assigned to the virtual drive.

4. The computer program product of claim 1, wherein:
   the first data storage device is controlled via a first type of control interface; and
   at least a second data storage device in the second RAID group is controlled via a second type of control interface that is different than the first type of control interface.

5. The computer program product of claim 4, wherein:
   the first type of control interface is a fiber channel control interface; and
   the second type of control interface is a control interface selected from a group consisting of a SATA control interface, a SCSI control interface and a SAS control interface.

6. The method of claim 1, wherein the computer-readable program code configured to determine whether the virtual drive is healthy comprises:
  computer-readable program code configured to determine whether the second RAID group comprises a second data storage device that has failed or for which there is an indication of imminent failure.

7. The computer program product of claim 1, further comprising:
  computer-readable program code configured to automatically define the virtual drive in response to identifying the failure indication.

8. The computer program product of claim 1, wherein:
  the computer-readable program code configured to provision the virtual drive to serve as the virtual hot spare within the first RAID group comprises computer-readable program code configured to read/write enable the virtual drive; and
  the virtual drive is read-only enabled prior to the virtual drive being provisioned.

9. The computer program product of claim 1, further comprising:
  computer-readable program code configured to identify an indication that the first data storage device has been replaced with another data storage device; and
  computer-readable program code configured to return the virtual drive to a pool of available virtual drives.

10. The computer program product of claim 9, further comprising:
  computer-readable program code configured to read-only enable the virtual drive when the virtual drive is returned to the pool of available virtual drives.

11. A computer program product comprising:
  a computer-readable storage device having computer-readable program code embodied therewith, the computer-readable program code comprising:
  computer-readable program code configured to identify a failure indication for a first data storage device that is a member of a first RAID group of a storage array;
  computer-readable program code configured to determine whether a virtual drive is healthy; and
  computer-readable program code configured to provision a virtual drive to serve as a virtual hot spare within the first RAID group to replace the first data storage device, wherein
  the virtual drive is a data storage volume defined to include a plurality of logical storage volumes defined in at least one other RAID group in at least a second storage array,
  the computer-readable program code configured to provision the virtual drive to serve as the virtual hot spare within the first RAID group comprises provisioning the virtual drive only if the virtual drive is healthy, and
  the computer usable storage device is not a transitory, propagating signal per se.

12. A system comprising:
  a processor configured to initiate executable operations comprising:
  external to a storage array, identifying a failure indication for a first data storage device that is a member of a first RAID group within the storage array;
  identifying a virtual drive that is defined to include at least one logical storage volume defined in a second RAID group; and
  determining whether the virtual drive is healthy; and
  provisioning the virtual drive to serve as a virtual hot spare within the first RAID group to replace the first data storage device, wherein
  provisioning the virtual drive to serve as the virtual hot spare within the first RAID group comprises provisioning the virtual drive only if the virtual drive is healthy.

13. A computer program product, comprising:
  a computer-readable storage device having stored therein computer-readable program code, the computer-readable program code, which when executed by a computer hardware system, causes the computer hardware system to perform:
  identifying a failure indication for a first data storage device that is a member of a first RAID group within a storage array;
  identifying, after the failure indication, a healthy virtual drive including a first logical storage volume defined in a second RAID group with the storage array; and
  provisioning the virtual drive to serve as a virtual hot spare within the first RAID group to replace the first data storage device, wherein
  the virtual drive is provisioned to serve as the virtual hot spare only upon the virtual drive being identified as healthy, and
  the computer usable storage device is not a transitory, propagating signal per se.

14. The computer program product of claim 13, wherein:
  the virtual drive including at least a second logical storage volume defined in a third RAID group, and
  each of the first and second logical storage volumes contribute a respective portion of an overall storage volume assigned to the virtual drive.

15. The computer program product of claim 13, wherein:
  the first data storage device is controlled via a first type of control interface; and
  a second data storage device in the second RAID group is controlled via a second type of control interface that is different than the first type of control interface.

16. The computer program product of claim 15, wherein:
  the first type of control interface is a fiber channel control interface; and
  the second type of control interface is a control interface selected from a group consisting of:
    a SATA control interface,
    a SCSI control interface, and
    a SAS control interface.

17. The computer program product of claim 13, wherein the computer-readable program code further causes the computer hardware system to perform:
  automatically defining the virtual drive in response to identifying the failure indication.

18. The computer program product of claim 13, wherein:
  the provisioning the virtual drive includes read/write enabling the virtual drive; and
  the virtual drive is read-only enabled prior to the virtual drive being provisioned.

19. A system, comprising:
  at least one processor, wherein the at least one processor is configured to initiate and/or perform:
  identifying a failure indication for a first data storage device that is a member of a first RAID group within a storage array;
  identifying, after the failure indication, a healthy virtual drive including a first logical storage volume defined in a second RAID group with the storage array; and
  provisioning the virtual drive to serve as a virtual hot spare within the first RAID group to replace the first data storage device, wherein the virtual drive is provisioned to serve as the virtual hot spare only upon the virtual drive being identified as healthy.

20. The system of claim 19, wherein:
the virtual drive including at least a second logical storage volume defined in a third RAID group, and
each of the first and second logical storage volumes contribute a respective portion of an overall storage volume assigned to the virtual drive.

21. The system of claim 19, wherein:
the first data storage device is controlled via a first type of control interface; and
a second data storage device in the second RAID group is controlled via a second type of control interface that is different than the first type of control interface.

22. The system of claim 19, wherein:
the first type of control interface is a fiber channel control interface; and
the second type of control interface is a control interface selected from a group consisting of:
a SATA control interface,
a SCSI control interface, and
a SAS control interface.

23. The system of claim 19, wherein the at least one processor is further configured to initiate and/or perform:
automatically defining the virtual drive in response to identifying the failure indication.

24. The system of claim 19, wherein:
the provisioning the virtual drive includes read/write enabling the virtual drive; and
the virtual drive is read-only enabled prior to the virtual drive being provisioned.

\* \* \* \* \*